United States Patent
Almeida (10) Patent No.: US 10,998,757 B2
(45) Date of Patent: May 4, 2021

(54) SMARTPHONE INTERFACED AUTOMOTIVE SMART BATTERY WITH SELF BOOSTING CAPABILITY

(71) Applicant: Vijay Brazanton Almeida, Fremont, CA (US)

(72) Inventor: Vijay Brazanton Almeida, Fremont, CA (US)

( * ) Notice: Subject to any disclaimer, the term of this patent is extended or adjusted under 35 U.S.C. 154(b) by 262 days.

(21) Appl. No.: 16/213,377

(22) Filed: Dec. 7, 2018

(65) Prior Publication Data

US 2020/0169114 A1 May 28, 2020

Related U.S. Application Data

(60) Provisional application No. 62/771,159, filed on Nov. 25, 2018.

(51) Int. Cl.
| | |
|---|---|
| *H02J 9/06* | (2006.01) |
| *B60R 16/033* | (2006.01) |
| *G07C 5/00* | (2006.01) |
| *B60R 16/023* | (2006.01) |
| *H02J 7/00* | (2006.01) |
| *H02J 1/10* | (2006.01) |
| *B60R 16/04* | (2006.01) |
| *H02J 7/34* | (2006.01) |
| *G06F 9/44* | (2018.01) |

(52) U.S. Cl.
CPC .......... *H02J 9/061* (2013.01); *B60R 16/0231* (2013.01); *B60R 16/0238* (2013.01); *B60R 16/033* (2013.01); *B60R 16/04* (2013.01); *G07C 5/008* (2013.01); *H02J 1/122* (2020.01); *H02J 7/00* (2013.01); *H02J 7/0047* (2013.01); *H02J 7/342* (2020.01); *G06F 9/44* (2013.01); *G07C 2205/00* (2013.01); *H02J 2310/46* (2020.01)

(58) Field of Classification Search
CPC ...... H02J 2310/46; H02J 1/122; H02J 7/0047; H02J 7/342; H02J 7/00; H02J 9/061; B60R 16/04; B60R 16/0238; B60R 16/0231; B60R 16/033; G07C 2205/00; G07C 5/08; G06F 9/44
USPC ..... 307/9.1, 10.6, 85, 64, 46, 130, 117, 116, 307/139, 134
See application file for complete search history.

(56) References Cited

U.S. PATENT DOCUMENTS

| 2019/0013692 A1* | 1/2019 | Dellevergini | ........... H02J 7/345 |
| 2020/0072177 A1* | 3/2020 | Clarke | ................ F02N 11/0862 |

* cited by examiner

*Primary Examiner* — Arnold M Kinkead (57) ABSTRACT

A smart automotive battery electrical energy storage device-system with built-in backup power. The battery has a primary power unit and a booster power unit which may reside in the same enclosure as that of the primary power unit and primary power unit and a booster power unit are electrically isolated most of the time. The primary power unit and a booster power unit are electrically connected intermittently when certain conditions are sensed. The battery has an electronic control unit with wireless transceiver electronic element. The booster power unit can be connected to the primary power unit using a smartphone application. The nominal voltage provided by the booster power unit can be same, higher or lower than the nominal voltage provided by primary power unit. Each of the primary power unit and booster power unit is comprised of multiple individual battery cells.

4 Claims, 9 Drawing Sheets

SMARTPHONE INTERFACED AUTOMOTIVE SMART BATTERY WITH SELF BOOSTING CAPABILITY

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The invention relates to a system of monitoring, testing and boosting starting-lighting-ignition (Standard SLI) battery of automotive vehicles, recreational vehicles (RVs) and motorboats based on the internet of things methodology. A Standard SLI battery of automotive vehicles is referred to as primary power unit in the current invention. The invention more particularly allows remotely establishing electrical connection between booster power unit and primary power unit, using peripheral handheld devices like a smartphone, for charging the primary power unit for jump starting an automotive vehicle. Combining a booster power unit with primary power unit along with an interface with peripheral handheld devices like a smartphone provides a new and improved automotive smart starting-lighting-ignition (Smart SLI) battery.

Description of the Related Art

Flat, faulty or dead battery has been one of the common reasons of automotive vehicle breakdowns. With increased use of electronic equipment, peripherals and accessories in automotive vehicles the consumption and demand for battery power has increased. Most of the time automotive vehicles or motorboats are equipped with only a single starting battery which is referred to as primary power unit in the current invention.

In case this starting battery or primary power unit is drained below the electric power required for engine cranking, the vehicle cannot be started and driver needs to jump start the vehicle with assistance from a battery in another vehicle or from a portable jump starter. This process is manual, tedious and may not be available when needed. The portable jump starter if used needs to be manually charged regularly. The current process also involves opening the hood of a vehicle and working in close proximity of the automotive battery. Considerable skills and knowledge of the automotive starting system are required to perform a jump start procedure or to check the health of battery and starting system. The current process involves some risk of acid burns, fire and electric shock.

There are multiple inventions that have been proposed in prior art regarding automotive smart battery. For instance, a US patent Pub. No. 2008/0199737 issued to Universal Supercapacitors Llc discloses an electrochemical supercapacitor/lead-acid battery hybrid electrical energy storage device. A hybrid lead-acid battery/electrochemical capacitor electrical energy storage device. The lead-acid battery and electrochemical capacitor reside in the same case and are electrically connected. Preferably, a hybrid device of the present invention includes at least one non-polarizable positive electrode, at least one non-polarizable negative electrode, and at least one polarizable electric double layer negative electrode. Separators reside between the electrodes and the separators and electrodes are impregnated with an aqueous sulfuric acid electrolyte. A hybrid device of the present invention exhibits high power characteristics.

A U.S. Pat. No. 6,424,511 issued to Purisys Inc discloses an automotive battery disconnect device. A battery disconnect device includes a housing with a trip/sense circuit, a sealed solenoid and two bars. The solenoid includes a spring-loaded contactor disposed in a sealed chamber which normally bridges the bars and is constructed to provide a very low resistivity between the bars. When a coil of the solenoid is activated, in response, for example, to a low battery voltage, the contactor moves away from the bars and is kept in an open position by a magnet. The contactor can be closed or returned to the original position by a manual push button or by a close circuit operated from a remote switch. Additionally, the contactor may be opened by using a remote button to act as an anti-theft device.

A U.S. Pat. No. 9,156,356 is an intelligent battery disconnect issued to GTR Development LLC. The present invention is an electronically controlled battery contactor that opens (disconnects) or closes (connects) the battery circuit from the other parts of a motor vehicle electrical system based on measured or sensed data derived from monitoring the electrical system, communicating with other on-board control units, and pre-programmed requirements specific to the vehicle operation. The primary functions are to protect the battery from excessive current drain when the vehicle is parked, protect against short circuits across the main electrical feed, and provide emergency disconnect for vehicle impact, rollover or sensed thermal events. A programmed delay function controls the opening of the contactor in conjunction with other electronic control units that may require electrical power for a period of time after vehicle shutdown. A master electrical disconnect switch is provided for manual override for servicing the vehicle or during an emergency.

System for starting an internal combustion engine for motor vehicles bearing U.S. Pat. No. 5,207,194 is issued to Industrie Magneti Marelli SpA. The system includes a storage battery, and an electric starter motor operable to rotate the internal combustion engine. A capacitor of high-capacitance, arranged immediately adjacent the electric motor, is adapted to store enough electrical energy to supply the electric motor during the starting of the internal combustion engine. A connection control system in a first condition connects the capacitor to the battery to enable the capacitor to be recharged and, in a second condition, connects the capacitor to the electric motor to enable electrical energy to be transferred thereto.

Battery Boost Jump Starter bearing US patent Pub. No. 2014/0159509 is assigned to Mathew Inskeep. The patent discloses a portable battery boost and jump starter apparatus for charging a vehicle battery is described. The apparatus can monitor and determine the existence of a fault condition in the vehicle battery and provide a battery boost or jump start depending on the level of depletion.

Jump starter with built-in battery charger bearing US patent Pub. No. 2007/0285049 is issued to Vector Products Inc. The patent discloses a jump starter is provided. The jump starter may be designed as a versatile, portable jump starter addressing the most common needs of power for a consumer. The jump starter may provide DC power, AC power, portable battery charging capability, and other power providing capabilities.

An apparatus for charging and desulfating lead-acid batteries bearing U.S. Pat. No. 6,184,650 is issued to Synergistic Tech Inc. The patent discloses an apparatus for charging and desulfating lead-acid batteries provides a DC electrical charging current to the battery terminals to charge the battery to a fully charged voltage during a bulk charge mode. When the battery reaches a fully charged voltage, the apparatus switches to a float charge mode where the battery voltage decreases to a float voltage less than the fully charged voltage and is maintained at this level. When the apparatus is in the float charge mode, the battery charging current is turned rapidly on and off to maintain the battery at the float voltage and to desulfate the battery. When the battery voltage drops to a predetermined value below the float voltage, the bulk charge mode is reentered.

Multi-purpose battery jump starter and reconditioner bearing US patent Pub. No. 2010/0301800 is issued to Mathew Inskeep. A multi-purpose battery jump starter and reconditioner. The device is portable and includes electronic circuitry for use in desulfating lead-acid batteries. A rechargeable internal battery permits operation in remote conditions. Accessories include an air compressor, DC outlet, USB outlet, and light to cause cycling of the battery for optimum life. The jump starter, cables and air compressor are all integrated into a light weight compact housing.

A US patent Pub. No. 2018/0215274 is a portable vehicle battery jump start apparatus with safety protection and jumper cable device thereof is issued to Noco Co. A handheld device for jump starting a vehicle engine includes a rechargeable lithium ion battery pack, a microcontroller, and a jumper cable device. The lithium ion battery is coupled to a power output port of the device through a FET smart switch actuated by the microcontroller. A vehicle battery isolation sensor connected in circuit with positive and negative polarity outputs connectable to the jumper cable device detects the presence of a vehicle battery connected between the positive and negative polarity outputs. A reverse polarity sensor connected to the circuit with the positive and negative polarity outputs detects the polarity of a vehicle battery connected between the positive and negative polarity outputs, such that the microcontroller will enable power to be delivered from the lithium ion power pack to the output port only when a good battery is connected to the output port and jumper cable device, and only when the battery is connected with proper polarity of positive and negative terminals.

A US patent Pub. No. 2016/0126765 is an apparatus and method for charging batteries is issued to Tek Global Sri. It is an apparatus and a method for charging a battery are disclosed. The apparatus includes a LED member that includes a single LED that is suitable for emitting light of different colors, each color corresponding to a different operating status of the apparatus, and an acoustic signaling device that is suitable for emitting an acoustic signal indicating a malfunction of the apparatus or the battery. The method includes a first battery heating and desulphation step during which the battery is supplied with current pulses having a maximum value that is considerably lower than the maximum value of the charging current in a subsequent second constant current charging step, each current pulse being generated when the current absorbed by the battery after the delivery of a previous current pulse falls below a minimum preset value.

A US patent Pub. No. 2011/0128154 issued to Flow-Rite Controls Ltd is a battery electrolyte level indicator. The patent discloses a battery electrolyte monitor including a probe and a control circuit. The control circuit includes a capacitive element within the probe. The probe is acid resistant, and therefore the probe protects the capacitive element from contact with the battery electrolyte. The control circuit periodically charges and discharges the capacitive element using direct current. Depending on at least one of a charging characteristic and a discharging characteristic, the control circuit determines the electrolyte level. If the electrolyte is below a desired minimum level, the control circuit illuminates an indicator light.

Jump starter bearing U.S. Pat. No. 5,793,185 is issued to Deltona Transformer Corp. The patent discloses a jump starter has a hand-held charger case (1) that contains an internal battery (8), a battery charger (7), connections and controls that provide a needed variety of foolproof and convenient care of external batteries (9) such as vehicle batteries. Control components and circuits are provided to prevent overcharging and incorrect connection to batteries and to allow an external battery to be charged directly by the charger or by the internal battery. Cables, connections and controls allow the charger to accept AC electricity through an AC input cord (3) or DC electricity through a DC input cord (4) and respective converters (5, 6). Jump-start cables (27, 28, 29) with clamp connections (30) are positioned on opposite sides (34, 37) of the charger case and supportable by covered nonconductive cleat-support members (30, 31) to prevent contact with each other or with other objects when not in use. The AC input cords and DC input cords are positioned on opposite sides of the case for additional safety.

Portable jump starter apparatus with simplified safety protection bearing U.S. Pat. No. 9,768,435 is issued to Stark Power Inc. The patent discloses an apparatus for increasing the efficiency and safety of a starter battery for a starter motor of an internal combustion engine in a battery pack arrangement with one or more lithium-based cells. The invention includes a solid state switching configuration for high powered battery systems for protecting against overcharging, over-discharging and short circuiting of batteries, especially starter batteries for internal combustion engines. The invention is also useful as a portable jump starter for internal combustion engines, as well as a charger for batteries and battery-operated electronic devices.

An Energy management system for automotive vehicle bearing U.S. Pat. No. 7,688,074 is issued to Midtronics Inc. A battery monitor is provided for use with a battery of an automotive vehicle. The battery monitor can provide real time battery condition measurements and can selectively control the charging of the battery through an alternator of the vehicle based upon the measured battery condition.

The existing solutions do not provide convenient means of remotely monitoring automotive battery condition, remotely electrically connecting booster power unit, receiving notifications of low voltage or charge levels of the battery, remotely conducting battery load tests, periodically logging battery vital readings and being able to retrieve such readings remotely.

It is a greatly desirable feature to monitor the primary power unit and connect booster power unit power using peripheral handheld devices like a smartphone or a portable computer or a laptop.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of automotive battery, provided for remotely monitoring, testing and boost charging primary power unit and electrically connecting and disconnecting booster power unit based on the internet of things methodology and wireless technology.

The most important objective of the invention is to provide a new and improved method and apparatus where the combination of primary power unit, booster power unit and a smartphone connectivity allows the automotive battery to function as a jump start booster to self-boost the primary power unit which provides power for the engine start.

It is also the objective of the invention to provide a system with the ability to configure the system to periodically briefly charge the primary power unit, thereby the engine starting performance is enhanced and the battery life is extended.

It is another objective of the invention to provide an apparatus where the device-system can be used to test automotive engine starter system.

It is also the objective of the invention to provide a device-system which can be used to test automotive charging system and diagnosing problems with at least alternator and charging voltage regulator.

It is also the objective of the invention to provide a Jump Start Booster where the device-system can be used for automotive jump-starting application without assistance of a second vehicle. The jump starting can be achieved with a push of a button on a smartphone application before starting the vehicle by usual means without getting out of the vehicle.

It is also the objective of the invention to provide a primary power unit charging where the device-system can be used for charging primary power unit from the power stored in the booster power unit with a click of a smartphone application button until the booster power unit discharges completely.

It is also the objective of the invention to provide a backup power where the device-system provides emergency backup power for a short duration to automotive vehicle when primary power unit does not provide sufficient power for any operation.

It is further the objective of the invention to provide an apparatus which is simple and easy to use.

Still yet another objective of the present invention is to provide a new and improved method and apparatus for the smartphone interfaced automotive smart battery with self-boosting capability which provides in the apparatuses and methods of the prior art some of the advantages thereof, while simultaneously overcoming some of the disadvantages normally associated therewith.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with this invention, a method and apparatus for the smartphone interfaced automotive smart battery with self-boosting capability.

As per preferred embodiment of the invention, the invention discloses a smart automotive battery electrical energy storage device-system with built-in backup power. The battery has a primary power unit and a booster power unit which may reside in the same enclosure as that of the primary power unit and the primary power unit and a booster power unit are electrically isolated most of the time. The primary power unit and a booster power unit are electrically connected intermittently when certain conditions are sensed. The battery has an electronic control unit with wireless transceiver electronic element. The booster power unit can be connected to the primary power unit using a smartphone application. The nominal voltage provided by the booster power unit can be same, higher or lower than the nominal voltage provided by primary power unit. Each of the primary power unit and booster power unit is comprised of multiple individual battery cells.

Methods, systems and apparatus are provided for smartphone interfaced vehicle battery device-system with remotely monitoring, and testing primary power unit, testing vehicle charging system, testing vehicle starter system, and electrically connecting and disconnecting booster power unit with primary power unit for use in automotive vehicles, recreational vehicles (RVs) and motorboats but not limited to it. The device-system comprises a booster power unit which is isolated from electric load during normal operation of the automotive vehicle and as and when required the booster power unit can be remotely electrically connected to primary power unit using smartphone application. The booster power unit is periodically automatically connected to the primary power unit for charging of booster power unit and for testing of backup and primary power unit. The primary power unit can be momentarily charged from booster power unit.

The smartphone interfaced vehicle battery device-system includes a primary power unit, a booster power unit, an electronic control unit, battery enclosure, booster power unit enclosure, primary power unit enclosure, electronic control unit enclosure, microcontroller unit, wireless transceiver electronic element, voltage sensing electronic element, data storage electronic element, temperature sensing electronic element, booster charging element, electronic switching element, manual push buttons, primary positive terminal of electronic control unit, booster positive terminal of electronic control unit, negative terminal of electronic control unit, electronic control unit attachments, positive terminal of primary power unit, negative terminal of primary power unit, positive terminal of booster power unit, negative terminal of booster power unit, booster attachments, primary power unit attachments, user device such as a smart phone with smartphone application or a portable computer software application or computer user interface software application.

The use of the smartphone interfaced vehicle battery device-system enables users to remotely electrically connect booster power unit to applications such as but not limited to remotely jump start a vehicle, remotely conduct electric load test on the primary power unit, remotely monitor the status of primary power and booster power unit voltage, receive at least one of primary power unit voltage and charge level status notifications on user device such as a smartphone or a portable computer application or a desktop computer. The device-system also periodically and automatically tests the health of the primary power unit, health of charging system of the automotive vehicle and health of starter system of the automotive vehicle. While a specific embodiment has been shown and described, many variations are possible. With time, additional features may be employed. The particular shape or configuration of the platform or the interior configuration may be changed to suit the system or equipment with which it is used.

The vehicle battery device-system that is shown in FIGS. 1-9 includes an automotive battery enclosing and comprising all elements, a primary power unit, a booster power unit, an electronic control unit enclosing and comprising all electronic elements, a battery enclosure, a booster power unit enclosure, a primary power unit enclosure, an electronic control unit enclosure, a microcontroller unit, a wireless transceiver electronic element, a voltage sensing electronic element, a data storage electronic element, a temperature sensing electronic element, a booster charging element, an electronic switching element for electrical connection of booster power unit with primary power unit, one or more manual push buttons to enable electrical connection of booster power unit with primary power unit without the use of smartphone application, a primary positive terminal of electronic control unit, a booster positive terminal of electronic control unit, a negative terminal of electronic control unit, one or more light emitting diodes, a positive terminal of primary power unit, a negative terminal of primary power unit, a positive terminal of booster power unit, a negative terminal of booster power unit, one or more booster attachments, a user device such as a smartphone for communicating wirelessly with wireless transceiver electronic element of the electronic control unit using wireless communication methods including but not limited to Bluetooth® and WiFi, a smartphone application and a wireless communication link.

Embodiments of the invention are discussed below with reference to FIGS. 1-9. However, those skilled in the art will readily appreciate that the detailed description given herein with respect to these figures is for explanatory purposes as the invention extends beyond these limited embodiments.

Figure 1:
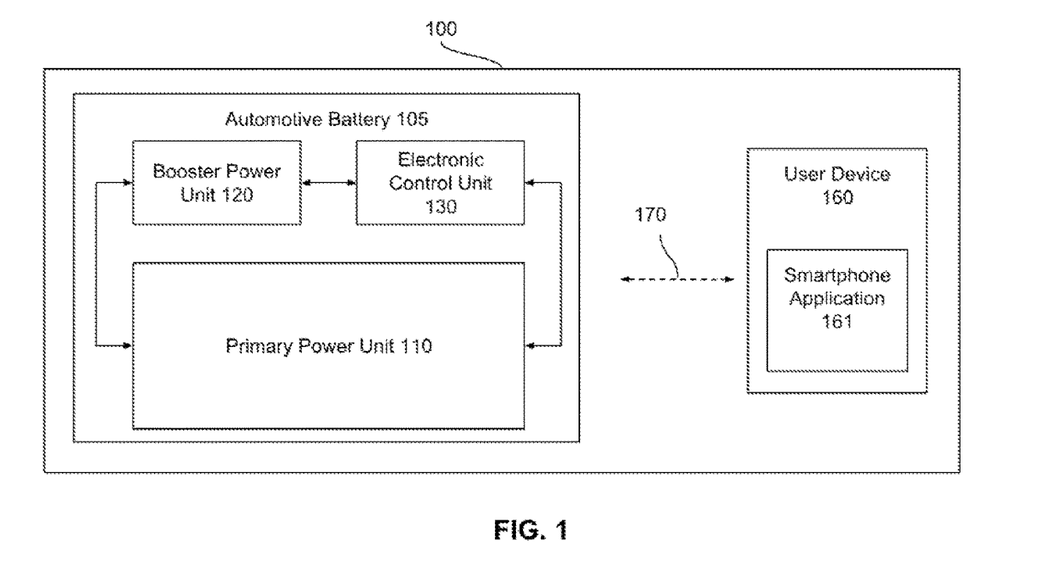
FIG. 1 illustrates a block diagram of different components of the vehicle battery device-system 100 as an example system configured according to some embodiments.

FIG. 1 illustrates block diagram of different components of the said smartphone interfaced vehicle battery device-system 100 wherein the booster power unit 120 and electronic control unit 130 are part of the automotive battery 105 according to one embodiment. In this embodiment, the booster power unit 120, functions as a backup power source in case the primary power unit 110 is completely or partially discharged and is unable to start the vehicle engine.

FIG. 1 illustrates a high-level overview of the vehicle battery device-system 100 which includes automotive battery 105 and a user device 160 with smartphone application 161. The automotive battery 105 includes primary power unit 110 and booster power unit 120 and electronic control unit 130. User device 160 can represent any form of a computing device (e.g., smartphones, tablets, laptops, etc.) that is capable of wirelessly interfacing with other computing devices, such as the electronic control unit 130 of the vehicle battery device-system 100. As shown in FIG. 1, the vehicle battery device-system 100 represents a combination of hardware and software components that enable wireless communication sessions, including data transfer and command transmission or signal propagation, to occur between the automotive battery 105 and the user device 160.

Figure 2:
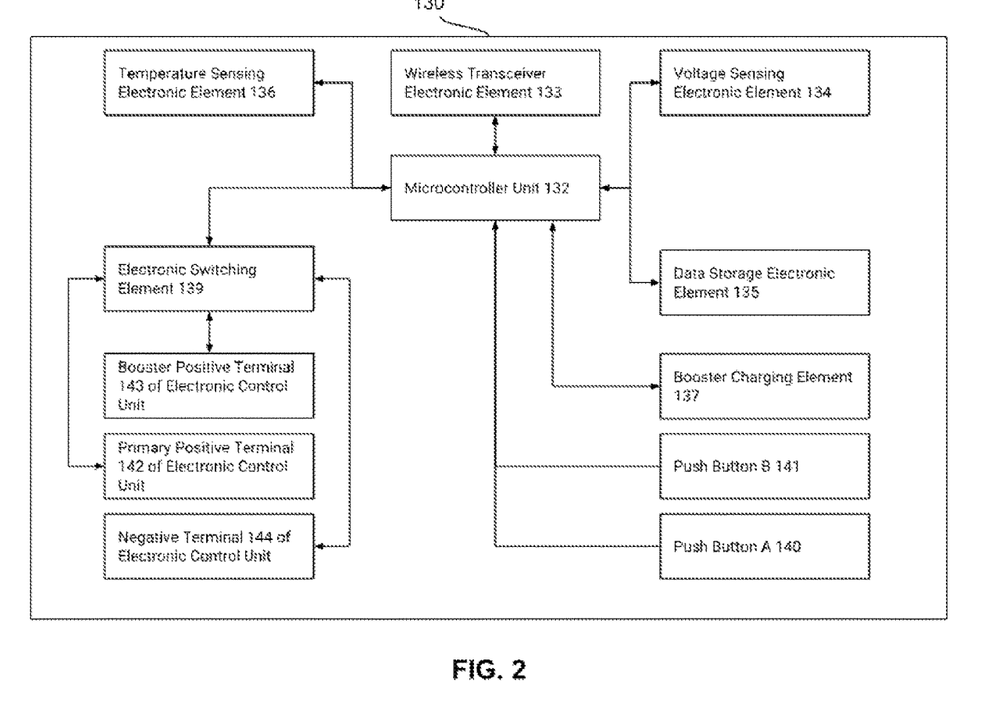
FIG. 2 illustrates block diagram of the different components of the electronic control unit 130 according to one embodiment.

FIG. 2 illustrates block diagram of the different components of the electronic control unit 130 according to one embodiment. The electronic control unit 130 includes a microcontroller unit 132, wireless transceiver electronic element 133, voltage sensing electronic element 134, data storage electronic element 135, booster charging element 137, electronic switching element 139, manual push button 140, manual push button 141, primary positive terminal 142 of electronic control unit 130, booster positive terminal 143 of electronic control unit 130, negative terminal 144 of electronic control unit 130.

Embodiments of the invention are discussed below with reference to FIGS. 1-9.

The wireless transceiver electronic element 133 communicates with the user device 160 using radiofrequency communication techniques such as Bluetooth® but not limited to it. The voltage sensing electronic element 134 senses the voltage of the primary power unit 110 and booster power unit 120 and feeds this data to the microcontroller unit 132.

The nominal voltage of the booster power unit 120 can be same as the nominal voltage of the primary power unit 110 or more than the nominal voltage of the primary power unit 110 or less than the nominal voltage of the primary power unit 110. In case the nominal voltage of the booster power unit 120 is same or less than the nominal voltage of the primary power unit 110, the electronic switching element 139 takes the same or lower voltage from the booster power unit 120, boosts the voltage to a level higher than the nominal voltage of the primary power unit 110 using DC-DC boost converter and supplies the boosted voltage to the primary power unit 110 to charge the primary power unit 110 from the booster power unit 120.

The booster power unit 120 can be a lead acid battery or an electric battery of any other suitable chemistry.

The primary power unit 110 is electrically connected to the charging and engine starting system of the vehicle where the said automotive battery 105 will be installed. The primary power unit 110 periodically gets charged from the charging system of the vehicle or from external charging sources. In normal operation, the primary power unit 110 provides sufficient power to the engine starting system of the vehicle during the engine starting operation.

The negative terminal 148 of the primary power unit, the negative terminal 150 of the booster power unit and the negative terminal 144 of electronic control unit are always electrically connected.

The electronic control unit 130 has a primary positive terminal 142 which is connected to positive terminal 147 of primary power unit. The electronic control unit 130 has a booster positive terminal 143 which is connected to positive terminal 149 of booster power unit.

The primary positive terminal 142 and the booster positive terminal 143 of the electronic control unit 130 can be electrically connected thru electronic switching element 139.

Figure 3:
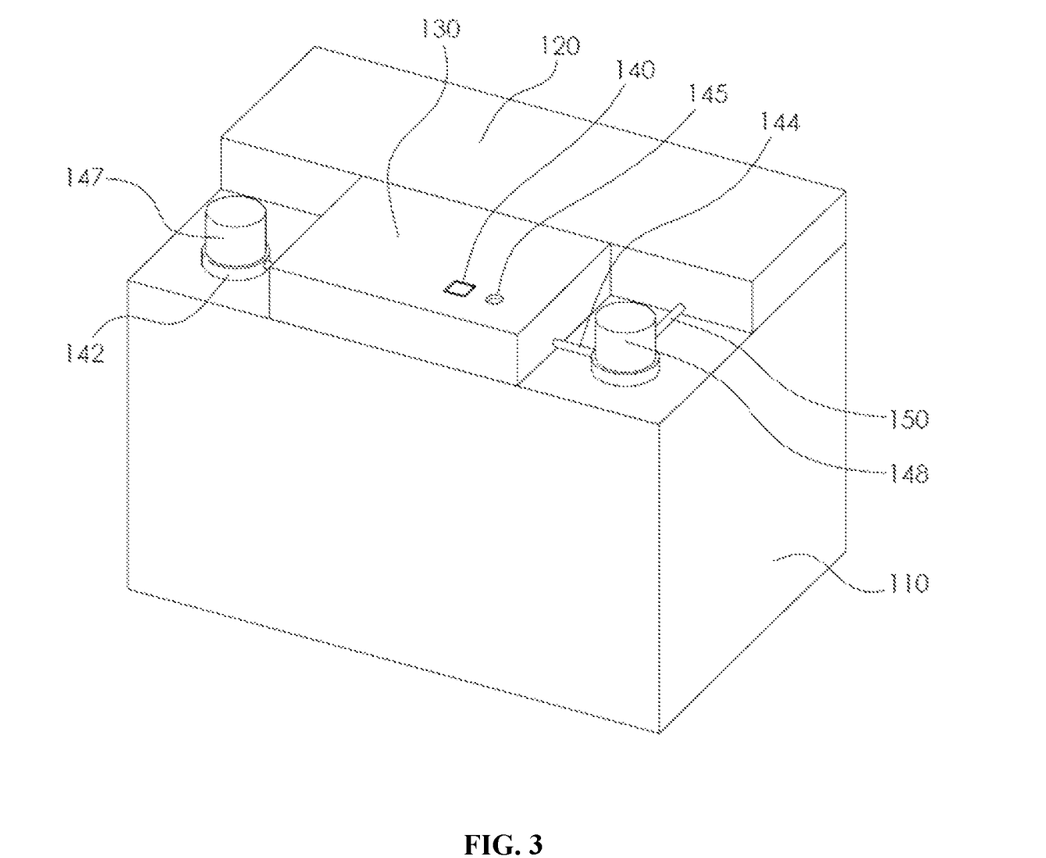
FIG. 3 is an illustration of the automotive battery 105 as part of vehicle battery device-system 100 according to one embodiment where the booster power unit 120 and the electronic control unit 130 are mounted on the top of primary power unit 110.
Figure 4:
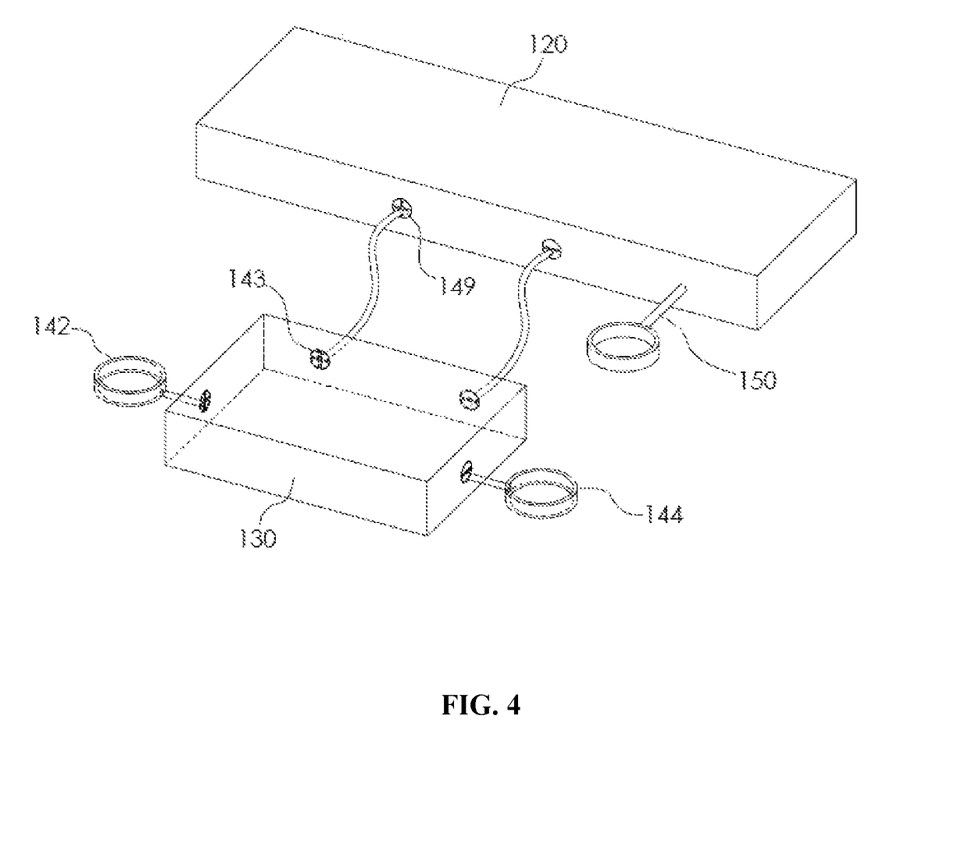
FIG. 4 is an illustration of the booster power unit 120 and the electronic control unit 130 according to some embodiment.
Figure 5:
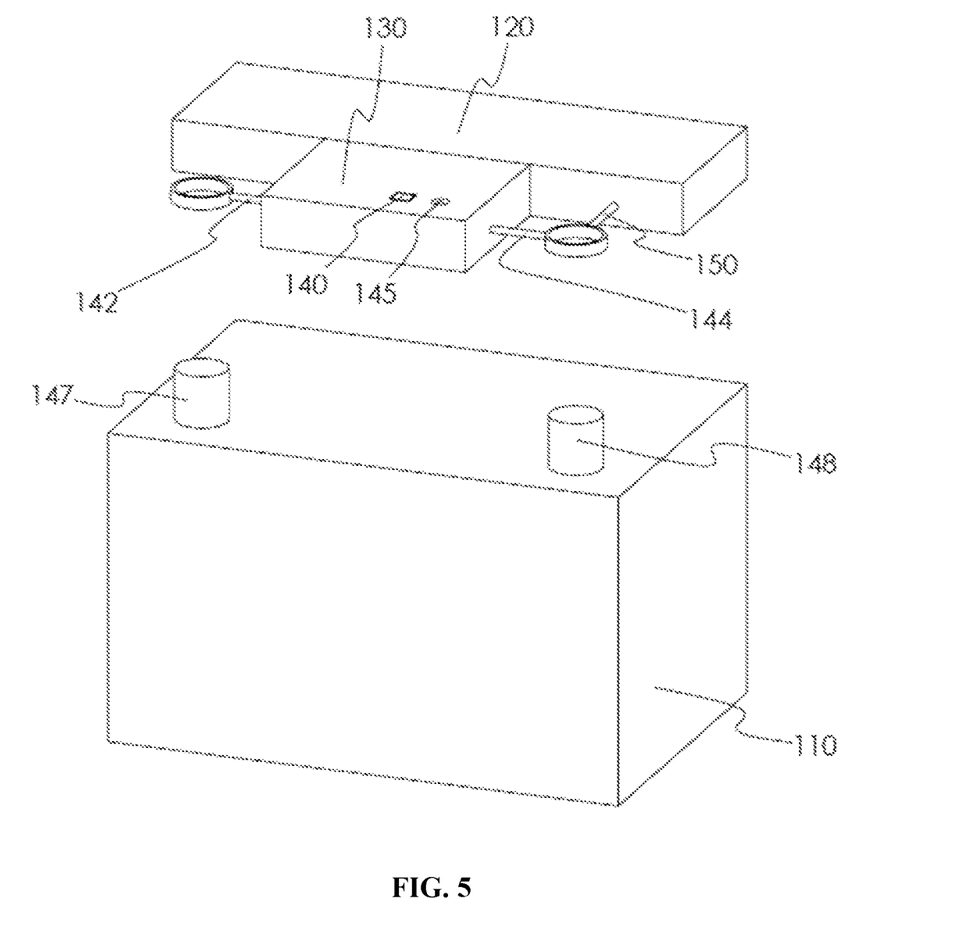
FIG. 5 is an illustration of the automotive battery 105 as part of vehicle battery device-system 100 according to some embodiment where the booster power unit 120 and the electronic control unit 130 are mounted on the top of primary power unit 110.
Figure 6:
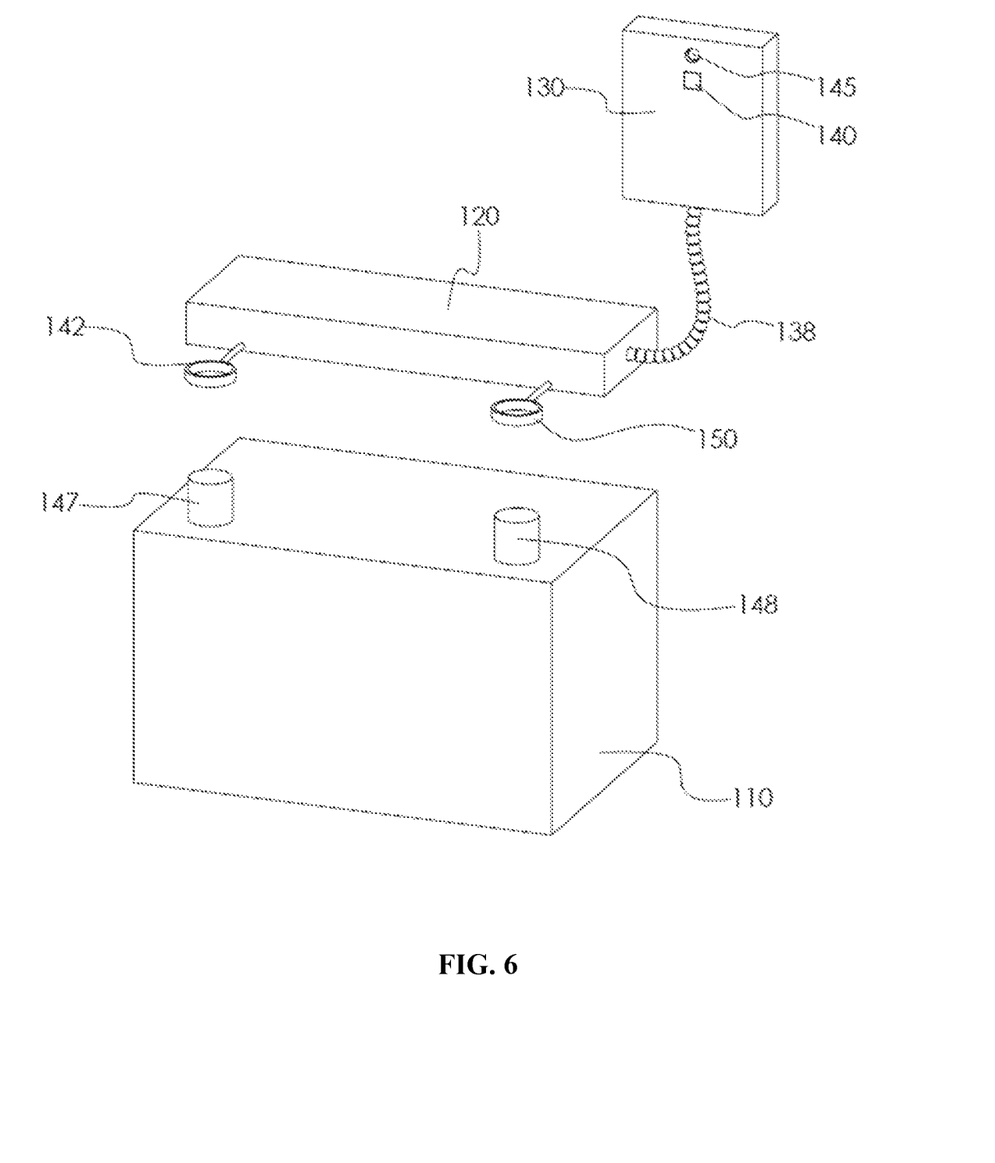
FIG. 6 is an illustration of the automotive battery 150 as part of vehicle battery device-system 100 according to one embodiment of the invention.
Figure 7:
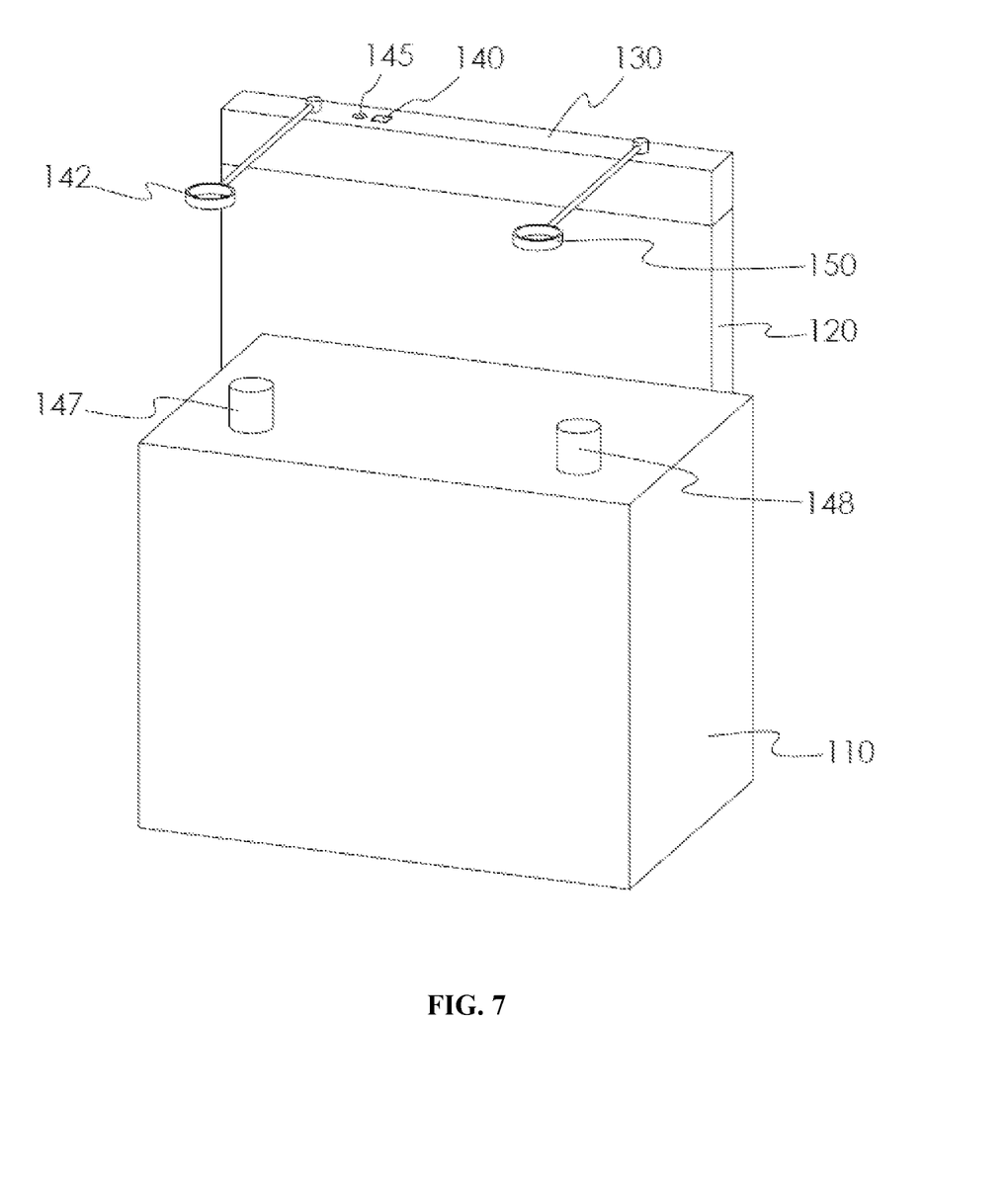
FIG. 7 is an illustration of the automotive battery 150 as part of vehicle battery device-system 100 according to one embodiment where the booster power unit 120 and the electronic control unit 130 are mounted on one side of primary power unit 110.
Figure 8:
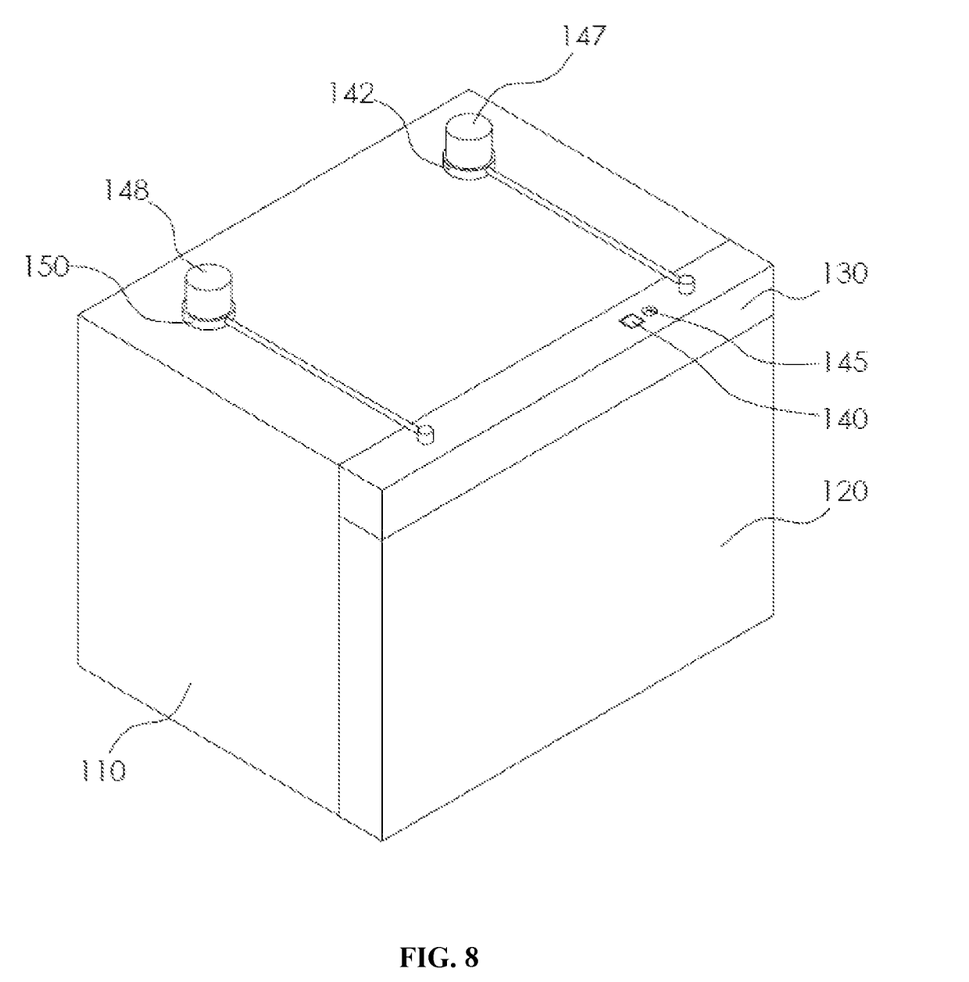
FIG. 8 is an illustration of the automotive battery 105 as part of vehicle battery device-system 100 according to one embodiment where the booster power unit 120 and the electronic control unit 130 are mounted on one side of primary power unit 110.
Figure 9:
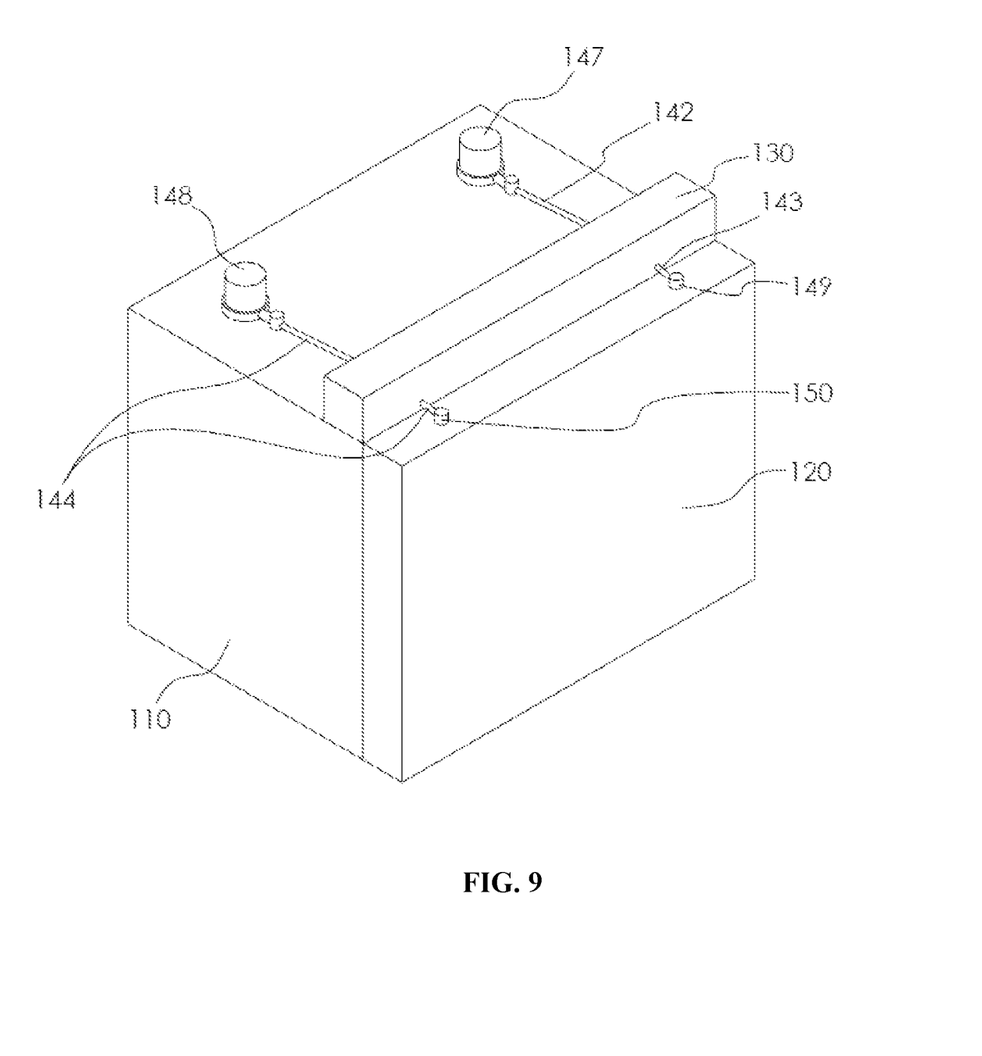
FIG. 9 is an illustration of the automotive battery 105 as part of vehicle battery device-system 100 according to one embodiment where the booster power unit 120 is mounted on one side of primary power unit 110 and the electronic control unit 130 is mounted on the top.

With reference to FIG. 1, FIG. 2 and FIG. 3, the microcontroller unit 132 periodically monitors the charge level of the booster power unit 120 and based on preset conditions, turns on the booster charging element 137 to charge the booster power unit 120. The microcontroller unit 132 monitors the charging of booster power unit 120 and upon sensing the full charge on the booster power unit 120, terminates charging. The microcontroller unit 132 prevents any discharging of the booster power unit 120 to the primary power unit 110 by not allowing turning on of the electronic switching element 139 when booster charging element 137 is turned on.

The preset conditions which initiate the charging of booster power unit 120 include, but not limited to it, are low charge level on the booster power unit 120, temperature sensed by the temperature sensing electronic element 136, time elapsed since the last charging of the booster power unit 120 or the primary power unit 110 is being discharged at a faster rate and have voltage level below certain threshold for more than few minutes.

A user in possession of user device 160 can wirelessly communicate with the wireless transceiver electronic element 133 to command microcontroller unit 132 to in turn signal the electronic control unit 130 to initiate electric connection between the booster power unit 120 and the primary power unit 110, wherein electronic control unit 130 turns on electronic switching element 139 to electrically connect booster power unit 120 to the primary power unit 110. The electrical connection will initiate charging of the primary power unit 110 from the booster power unit 120.

After the electric connection between booster power unit 120 and primary power unit 110 has been established, the user device 160 would wirelessly communicate with the electronic control unit 130 to receive primary power unit 110 voltage level and the duration of the electric connection, at any instance of time and would notify the user about the readiness of the primary power unit 110 to start the automotive vehicle. The smartphone application 161 on the user device 160 would display the primary power unit voltage level, and total boost charging time duration.

The electronic switching element 139 can be turned on or off by the electronic control unit 130 when it detects certain pre-specified connection or disconnection conditions by sensing and interpreting data obtained from voltage sensing electronic element 134.

One of the prespecified conditions is identifying the vehicle with stop-start system and to assist the engine start of such vehicles. In the stop-start system, the engine is automatically shut off when the vehicle is at rest to cut fuel use and eliminate idle emissions. It then restarts the engine automatically when the driver lifts off the brake or puts in the clutch to select 1st gear to get going again. During stop-start operation, the voltage of the primary power unit 110 varies frequently by more than a couple of volts due to frequent engine cranking and resumption of the charging of the primary power unit 110 from the vehicle alternator. Using the voltage sensing electronic element 134, the microcontroller unit 132 can be programmed to detect the presence of stop-start method by monitoring the frequent relatively large voltage changes on the primary power unit 110. The vehicle battery system can be configured by the user using the user device 160 to briefly charge the primary power unit 110 from the booster power unit 120 in a vehicle few minutes prior to estimated vehicle start. The brief charging introduces surface charge on the primary power unit 110 electrodes and this surface charge provides additional power in the sudden high discharge load introduced by vehicle engine start. The effective sudden high discharge load on the primary power unit 110 is reduced and this lowers the high discharge stress on the primary power unit 110 thereby extending the battery life. This is also a great advantage for cold starting where high discharge current is required and due to the availability of the surface charge, the engine starts quickly.

The system can also be configured to share the sudden high discharge load on the primary power unit 110. A combination of high cycle life primary power unit 110 and high discharge capacity booster power unit 120 with same or different battery chemistry as primary power unit 110 can be used for high discharge load sharing. This enables a cost-effective solution for extending the battery life.

With reference to FIG. 1 to FIG. 9, the electronic switching element 139 can also be turned on or off by manual push button 141 without the need of a user device 160. When a manual push button 141 is pressed, it signals microcontroller unit 132 to in turn signal the electronic control unit 130 to initiate electric connection between the booster power unit 120 and the primary power unit 110, wherein electronic control unit 130 turns on electronic switching element 139 to electrically connect booster power unit 120 to the primary power unit 110. The electrical connection will initiate charging of the primary power unit 110 from the booster power unit 120. The light emitting diode 145 will be turned solid on to indicate the readiness of the primary power unit 110 to start the automotive vehicle.

With reference to FIG. 1 to FIG. 9, in normal operation, the voltage sensing electronic element 134 of electronic control unit 130, periodically monitors the voltage level of primary power unit 110 and stores the data in the data storage electronic element 135. Periodically the voltage sensing electronic element 134 continuously monitors the voltage level of primary power unit 110 to detect high electric load conditions such as engine cranking but not limited to it. In such high load conditions, the voltage level of the primary power unit 110 decreases suddenly. When the decrease in the voltage level goes below certain threshold of normal healthy battery the electronic control unit 130 identifies this data point with weak battery health or bad battery health depending on the decrease of voltage level in the primary power unit 110. The electronic control unit 130 wireless transceiver electronic element 133 then wirelessly notifies user device 160 about the battery health condition. In case no paired user device 160 is in the wireless communication range, the electronic control unit 130 stores this data in the data storage electronic element 135 and sends this data to the paired user device 160 as and when the paired user device 160 is in the wireless communication range. In another operation mode, a user in possession of paired user device 160 can wirelessly command the electronic control unit 130 to enter the continuous voltage monitor mode to determine the health of the primary power unit 110. The user in such scenario starts the vehicle engine for a brief period of time and turns the vehicle engine off. During this duration the electronic control unit 130 performs the said health check on the primary power unit 110 and transmits the health check data to user device 160.

With reference to FIG. 1 to FIG. 9, the voltage sensing electronic element 134 automatically periodically monitors the voltage output of automotive vehicle charging system and stores the data in the data storage electronic element 135. When the voltage level is above or below a certain threshold of normal healthy charging system the electronic control unit 130 identifies this data point as bad or weak charging system. The electronic control unit 130 wireless transceiver electronic element 133 then wirelessly notifies user device 160 about charging system health condition. In case no paired user device 160 is in the wireless communication range, the electronic control unit 130 stores this data in the data storage electronic element 135 and sends this data to the paired user device 160 as and when the paired user device is in the wireless communication range. In another operation mode, a user in possession of user device 160 and using it can wirelessly command the electronic control unit 130 to enter the continuous voltage monitor mode to determine the health of the charging system. The user in such scenario starts the vehicle engine for a brief period of time and turns off the vehicle engine. During this duration the electronic control unit 130 performs the said health check on the vehicle charging system and transmits the health check data to user device 160.

The resultant data generated from all or any testing and measurements conducted by various elements such as voltage sensing electronic element 134, booster charging element 137 is stored in data storage electronic element 135 and transmitted to user device 160 using wireless transceiver electronic element 133.

The numerous aspects, embodiments, implementations or features of the invention can be used separately or in any combination.

The wireless enablement of automotive battery with additional said elements, yields a battery that is able to perform new, improved and enhanced functions in a way that ordinary battery would not. With the capability of the automotive battery to wirelessly communicate with user device such as a smartphone, the invention can be extended to mount additional sensors and devices on the automotive battery to perform additional measurements and functions.

The advantages of the invention are various. One of the advantages of certain embodiments of the invention is that the said device-system having one or more electronic components embedded therein can serve to extend or augment capabilities of automotive vehicles. The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A vehicle battery device-system, comprising:
   a primary power unit for power;
   a booster power unit for boosting the primary power unit;
   an electronic control unit including a wireless transceiver electronic element;
   an electronic switching element for electrical connection of the booster power unit with the primary power unit; and
   a user device including a smartphone with a smartphone application, communicating wirelessly with the wireless transceiver electronic element of the electronic control unit using wireless radio frequency communication methods including Bluetooth® or WiFi,
   wherein a data storage element in said electronic control unit is configured to store sensed data which is wirelessly transmittable to said smartphone application.

2. A vehicle battery device-system, comprising:
   a primary power unit for power;
   a booster power unit for boosting the primary power unit;
   an electronic control unit including a wireless transceiver electronic element;
   an electronic switching element for electrical connection of the booster power unit with the primary power unit; and
   a user device including a smartphone with a smartphone application, communicating wirelessly with the wireless transceiver electronic element of the electronic control unit using wireless radio frequency communication methods including Bluetooth® or WiFi, wherein said booster power unit provides emergency backup power to an automotive vehicle door or a vehicle trunk unlock mechanism when the primary power unit does not have enough power for a door unlock mechanism.

3. A vehicle battery device-system, comprising:

a hardware part comprising a booster power unit, an electronic control unit, and an electronic switching element when installed on automotive starting-lighting-ignition battery, wherein said electronic switching element electrically connects said booster power unit for backup power to automotive starting-lighting-ignition battery when a smartphone application sends a signal to said electronic control unit via wireless transceiver element and wherein said electronic switching element electrically disconnects said booster power unit for backup power from the automotive starting-lighting-ignition battery when said smartphone application sends a signal to said electronic control unit via wireless transceiver element.

4. The vehicle battery device-system of claim 3, wherein the hardware part and automotive starting-lighting-ignition battery reside in a same enclosure.

\* \* \* \* \*